United States Patent [19]
Miller et al.

[11] Patent Number: 4,685,106
[45] Date of Patent: Aug. 4, 1987

[54] HIGH RATE MULTIPLEXER

[75] Inventors: Larry J. Miller, South Jordan; Glen D. Rattlingourd, Salt Lake City; Clifford T. Johnson, Sandy, all of Utah

[73] Assignee: Sperry Corporation, Blue Bell, Pa.

[21] Appl. No.: 646,015

[22] Filed: Aug. 31, 1984

[51] Int. Cl.⁴ .............................................. H04J 3/02
[52] U.S. Cl. ................................................... 370/112
[58] Field of Search .................... 370/100, 112, 79, 84

[56] References Cited

U.S. PATENT DOCUMENTS

| | | | |
|---|---|---|---|
| 3,924,079 | 12/1975 | Garrett | 370/112 |
| 3,940,566 | 2/1976 | Jeppsson et al. | 370/112 |
| 3,952,298 | 4/1976 | Winkelmann et al. | 370/112 |
| 4,133,981 | 1/1979 | Kibler | 370/100 |
| 4,160,877 | 7/1979 | Vander Mey | 370/112 |
| 4,271,508 | 6/1981 | Schenk | 370/112 |
| 4,298,987 | 11/1981 | Stattel et al. | 370/100 |
| 4,409,683 | 10/1983 | Woodward | 370/112 |
| 4,445,215 | 4/1984 | Svendsen | 370/112 |
| 4,473,901 | 9/1984 | Jensen | 370/100 |
| 4,477,900 | 10/1984 | Gruenberg | 370/112 |
| 4,520,480 | 5/1985 | Kawai | 370/100 |

Primary Examiner—Douglas W. Olms
Assistant Examiner—Kenneth I. Rokoff
Attorney, Agent, or Firm—G. Donald Weber, Jr.; Glenn W. Bowen

[57] ABSTRACT

A high rate multiplexing system which is capable of operating on multiple channels while ensuring synchronization of the system operation. The system includes a basic timing network for synchronizing the system operation. Automatic phase adjusters are used to re-align data signals with a clock signal whenever data transitions occur while the data is being sampled. Synchronizing circuits are used to insert synchronization data bits into the multiplexed data streams where appropriate. A medium rate multiplexer generates two different data streams, certain clock signals and strobe signals. A higher rate multiplexer is capable of operation in different modes, including but not limited to wideband operation or narrow band operation. A Manchester encoder combines data output signals into a single aggregate data stream.

20 Claims, 11 Drawing Figures

HIGH RATE MULTIPLEXER

GOVERNMENT CONTRACT NOTICE

This invention was made with government support under Contract No. F09604-83-C-0011-CLIN 4 awarded by the U.S. Air Force. The U.S. Government has certain rights in this invention.

BACKGROUND

1. Field of the Invention

This invention is directed at high rate multiplexing circuits, in general, and to a dual channel, high rate multiplexer circuit system, in particular.

2. Prior Art

In the prior art, there are numerous circuits and systems having the general purpose of providing what is known as a data link. A data link is used to, inter alia, communicate from the ground to an airborne craft or vice versa; or from an aircraft to any kind of a vehicle such as another aircraft or even a satellite. The performance of this operation requires the production of a single output signal in order to carry the necessary information. That signal must carry all of the information that is to be communicated whether it is voice generated, sensor generated, or generated from users that are doing specified things, such as reporting the weather, or the like. Whatever that information is, it has to be concentrated into one data stream in order to be used properly and efficiently. This is usually carried out by a multiplexer circuit which takes a number of these signals, from a plurality of users, and concentrates the signals into one output stream which is then transmitted to or from an aircraft as the data link information that it carries.

The multiplexers known in the past have been cumbersome, complex, difficult to produce, heavy, expensive, and so forth. All of these characteristics are undesirable in an aircraft.

In the recent past, a high rate multiplexer capable of operating at frequencies in the hundreds of megahertz region has been developed to take data from users at a synchronized rate and time division multiplex (TDM) the information up to a high rate. This was accomplished with a hybrid circuit approach which took a number of integrated circuits placed onto substrates and mounted into hybrid circuits. Typically, four or more of these hybrid circuits (depending upon configuration) are necessary in order to produce one of the multiplexing circuits.

However, the prior art multiplexers do not operate at a sufficiently high data rate to interact with sensors in order to get pictels, radar sensor information, or other types of information with a large amount of data that has to be transmitted rapidly. For example, in sending a single television frame, the signal is divided into pictels and a very high data rate is required to send a high resolution picture from an aircraft to the ground, or the like. Therefore, to produce a more efficient system, a very fast data rate is required.

SUMMARY OF THE INSTANT INVENTION

This invention is directed to a high rate multiplexing circuitry system. The system includes a basic timing network for synchronizing the system operation. Automatic phase adjusters are also used to re-align data signals with a clock signal whenever data transitions occur while the data is being sampled. Synchronizing circuits are used to insert synchronization data bits into the multiplexed data streams where appropriate. A medium rate multiplexer generates two different data streams, certain clock signals and strobe signals. A higher rate multiplexer is capable of operation in many different modes (e.g. wideband operation or narrow band operation). A Manchester encoder combines data output signals into a single aggregate data stream.

DESCRIPTION OF A PREFERRED EMBODIMENT

Figure 1A:
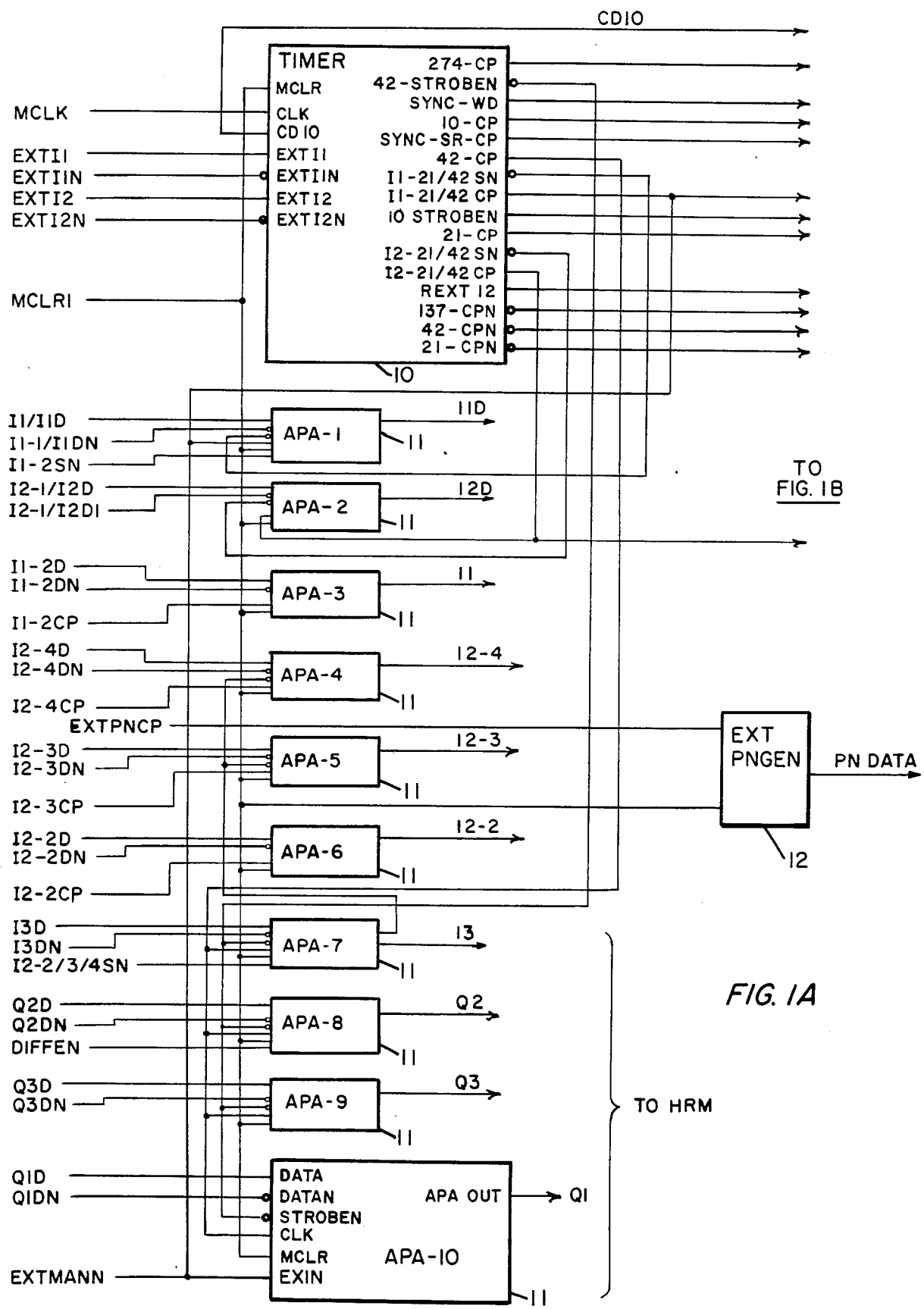
FIGS. 1A and 1B each show a portion of a block diagram of the multiplexer system (MUX) of the instant invention.
Figure 1B:
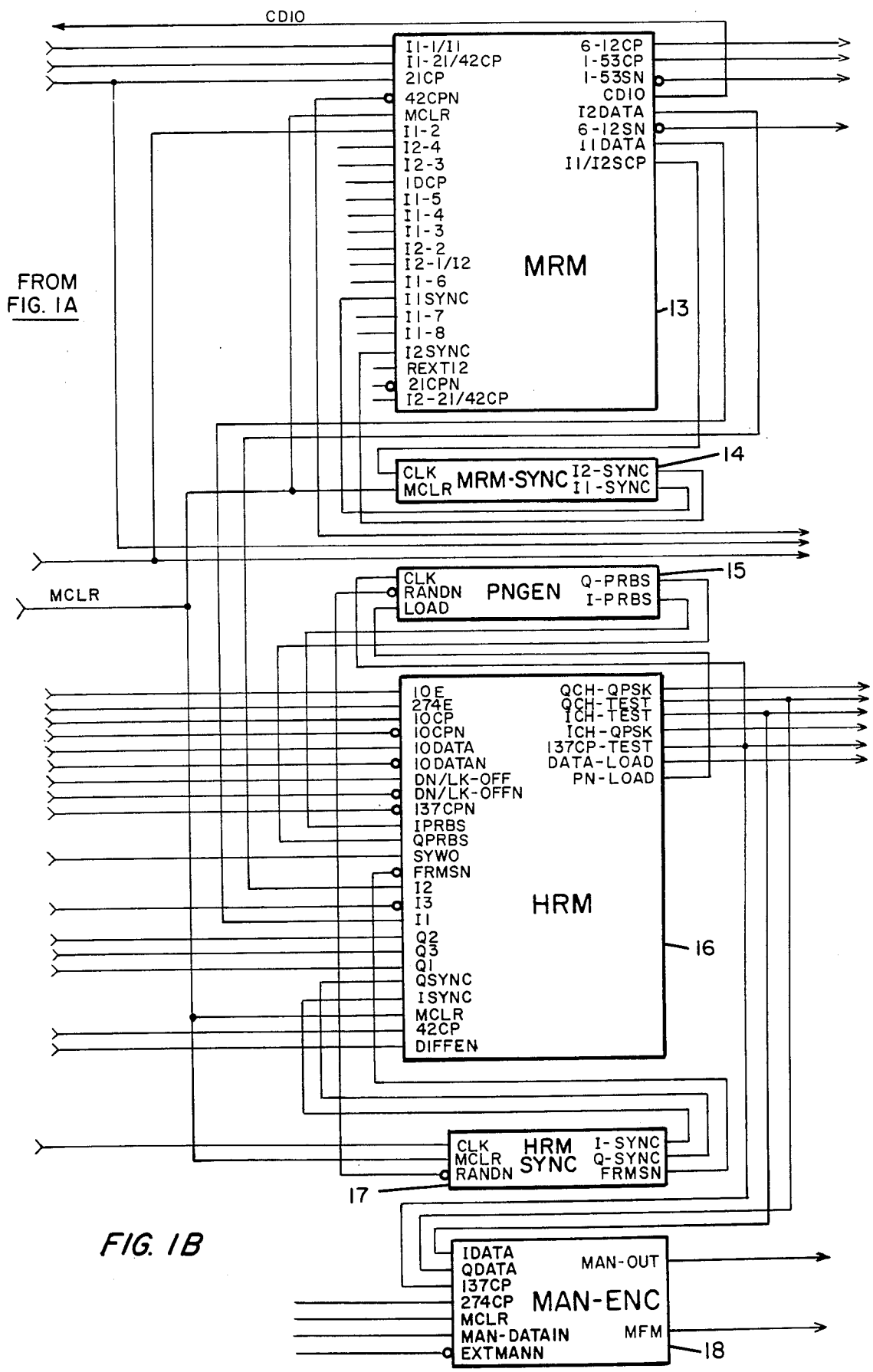

Referring concurrently to FIGS. 1A and 1B there is shown a block diagram of the instant invention. The system includes timer circuit 10 which is, generally, used to receive the master system clock signal MCLK and divide it by two thereby to generate two clock signals at half the rate of the master clock. These signals become the clocks that drive the I multiplexer and the Q multiplexer, respectively. That is, the system can be considered to comprise two multiplexers because this is an offset quadra-phase shift-keyed system (QPSK). The I channel and its complement comprise one multiplexer unit and the Q channel and its complement comprise the other. The I and Q channels are offset by 180°. The I and Q channels with the respective complements are generated and clocked out at half the master clock rate. The master clock is also divided down to obtain the user clock signals. The user clocks are divided in such a way that a clock period is gained when the system has generated a specified number of user clock signals. A sync bit is inserted into the extra clock period in the frame signal. This sync bit can be locked onto at the demultiplexing end of the system. The system will then know how to demultiplex the data that has been multiplexed. Therefore, the user clock signals are not square waves. In fact, the clock signals appear to jitter when the user is using them. By doing this an extra clock period is generated every 16 bits of the I or the Q channel frames. A distributed sync of one bit per 16 data bits is, thus, allowed to be inserted into the I and Q data channels. The timer circuit 10 controls when the sync bits are inserted into the I and Q data streams.

The timer circuit 10 also generates the user clocks below the high rate users. In one embodiment, the Q channel consists of three high rate users. Those are working at approximately one third of the Q rate plus the sync bit which is inserted every 16 bits. The I channel consists of one high rate user plus two other channels that may be high rate users or multiplexed up from numerous lower rate users. After being multiplexed, these channels will appear as high rate user channels to the I channel multiplexer. The timer circuit 10 controls the timing signals for those circuits that are multiplexed up from lower rates so that they can be multiplexed into the I channel and appear as normal high rate user channels.

As noted, timer 10 establishes the timing format and determines where the bits of the sync word should be inserted. It also generates the sync shift register clock pulse (SYNC-SR-CP) in order to be able to clock the sync bit at the right time and change it so that the next sync word bit will be ready to be used at that time. External controls tell the timer 10 whether the two variable I channels should be multiplexed from low rate users or whether they should be high rate user channels as are all the Q channels and the other I channel.

This embodiment includes ten automatic phase adjusters 11 (APA) referred to as either an APA-H or an APA-L. The difference between an APA-H and an APA-L is the power required thereby and the speed of operation. The H-type APA system will operate up to about 50 MHz and the L-type system will operate up to about 10 or 12 MHz. The basic function of the APA 11 is to correctly align the sampling user data to the internal multiplexer timing. That is, because this system is a synchronous device, the user issues back a data bit in response to a clock supplied to it. However, it is necessary to make sure that the edges of the data bit coming back do not align with the sampling time of the internal clock. Therefore, the automatic phase adjuster monitors a window around the sampling time of the user data. If the user data bit edges are changing during that window time, the APA 11 automatically switches 180° away from that point and begins sampling in the middle of the data bit. It will continue to do so unless the user data drifts to the point where the new sampling is occurring. This "sampling alignment" is desirable in order to prevent an ambiguity situation. That is, if the signals are in alignment and are sampled at the same time the data bit is changing, it will not always be possible to get a true sample. That is, the sample may detect the previous data bit or it may detect the next data bit twice. There is no inherent way to insure which data bit is going to be sampled. Thus, there may be a sampling ambiguity. However, the APA 11 assures that correct data is always supplied relative to the sampling operation. The data out of the APA 11 is supplied to the high rate multiplexer (HRM) shown in FIG. 1B, where it is available to be multiplexed into the I or the Q channels. One typical APA construction is shown and described in U.S. Pat. No. 4,208,724 by G. D. Rattlingourd which is incorporated herein by reference thereto.

The external PN generator 12 is a pseudo-random number generator circuit that produces, typically, a Hewlett-Packard 3780 compatible $2^9-1$ code that can be put onto any channel of the multiplexer. By monitoring the output of that channel at a far end demultiplexer, it can be seen how well the data link is performing.

In the past, this link monitoring system has required an external PN generator in order to bring a PN generated code into any of the channels for testing. With the PN generator 12 internal to the device, it can be selected and put onto any one of the channels through printed circuit board wiring, for example. This addition enhances the ability of bit error rate checking and testing of the device and system.

The medium rate MUX 13 is the I1 and the I2 information generator or the multiplexer for the I1 and the I2 channels. The I channel has I1, I2, I3 and sync signals that are combined to form the composite I data stream. Part of the combination is done in the high rate MUX (as described hereinafter), but the medium rate MUX (MRM) operates on only the I1 and I2 channels. There are different modes in which the MRM can operate. For example, I1 can be totally dedicated to a user in which case it would be considered a user high rate channel or it may be comprised of a $\frac{1}{2}$ rate channel, a $\frac{1}{4}$ rate channel, 6 each 1/28 rate channels plus the sync bit which comprises 1/28th of the channel. This multiplexed channel consists of 28 bits which are generated from the 8 rates mentioned above plus the sync bit. In the high rate mode of operation, the I1 channel signals appear strictly as user data without being framed into a specific number of bits. The timer 10 is the circuit that provides the clock and timing signals for that selection. The APA 11 provides either the high rate user data or the $\frac{1}{2}$ rate channel data. If the submultiplex operation is used, there is an APA for each of the additional channels. In the high rate operation, multiplexing of lower rate channels is suspended and assumes the role of passing the high rate user data directly to the I multiplexer.

The I2 signal has a similar situation although it does not work on exactly the same frequencies. It will operate as either a high rate user channel or it may be comprised of a $\frac{1}{2}$ rate channel, 3 each 1/7th rate channels, a 1/28th rate sync bit and a 1/28th rate unused bit. Neither the I1 nor the I2 channels have sync bits added thereto if they are high rate user data streams. Rather, they are dedicated solely to user information. If they are multiplexed from lower rate channels, then it is again necessary to skew the clocks so that every 28 bits a sync bit can be inserted into that channel. Therefore, the clocks going out to the low rate users will be skewed just as they are in the high rate users so that sync bits can be inserted. Sync bits are required for the demultiplexer to lock onto in order to demultiplex out the lower rate channels.

The medium rate MUX SYNC 14 (MRM-Sync) receives the clocking signals I1/I2 SCP from the medium rate MUX 13. The MRM-SYNC 14 generates two different 7-bit Barker codes that are inserted one bit for every 28 bits of the frame signal. One of the 7-bit Barker codes is used for the I1 channel when it is multiplexed from lower rate users and the other Barker code is used for the I2 channel. These sync bits are used by the far end demultiplexer to demultiplex the I1 and/or I2 channels out to the low rate users.

The PN generator 15 is a function circuit which may or may not be engaged in the system. The basic purpose of the PN generator is to overlay (Exclusive OR ADD) a PN code over the I and Q data streams in order to guarantee data transitions. This aids in the bit synchronization of the down converted data streams at the far end of the data link. The PN code overlay requires that the I and Q channel sync bits (7-bit Barker code) remain unchanged by the addition of the PN code, otherwise the far end demultiplexer would not be able to synchronize to the I and Q channel information. This PN code consists of a repetitive 128 bit sequence. The 128 bit sequence is required because that is the frame length of the I and Q channels. One sync word bit is inserted into the I and Q channel every 16 bits. Because a 7-bit Barker code is used as sync data (7×16=128), it requires 112 data bits to begin the repeat of the sync code. The PN code must align to the data in such a way that the sync word bits will effectively be Exclusive-OR ADDED with zero or, in other words, remain unchanged by this action.

In this embodiment, the EXT PN generator 12 produces the $2^9$-1 code and repeats at the rate of the selected external PN clock. The PNGEN 15 produces a 128 bit repetitive code which requires that the sync bits are always in the clear. The generators 12 and 15 are two different PN generators inasmuch as the implementation, the lengths, and the codes that they generate are not equivalent.

The high rate MUX 16 has two modes of operation. One is a narrowband mode of operation; the other is a wideband mode of operation. In the narrowband mode of operation, the high rate MUX receives a data stream at a relatively low rate, for example, up to 20-30 MHz in this embodiment. This data stream is split into two channels, viz., an I and a Q channel. At this point, an externally selectable differential encoding may or may not be performed on the data stream, which is then sent out as the I and the Q channel data. This is a different mode of operation and these channels are separate from everything that has been discussed to this point.

The other mode of operation is a high rate or a wideband mode of operation wherein the high rate I and the Q channels each operate at up to 137 MHz. These signals will also come through the HRM. In the preferred embodiment, there are three I channels and three Q channels. The three I channels, i.e. channels I1, I2, and I3 are demultiplexed into the I channel. Likewise, the three Q channels, i.e. channels Q1, Q2, and Q3 are demultiplexed into the Q channels with the respective sync bits. This information is sent out as the offset quadra-phase shift-keyed information. Also, test information is produced by HRM 16 which is the same as the quadra-phase except that it has not been differentially encoded. The HRM 16 also has the capability of differentially encoding, or not differentially encoding, the QPSK data streams. The signal "down-link-off" will enable or disable the QPSK data outputs. When enabled the modulation out of the QPSK ports will be "killed". The data load bit from the HRM 16 is used in test fixtures to reconstruct the I1, I2, I3, Q1, Q2 and Q3 data information without having to synchronize to the Barker code and then demultiplex these high rate user channels. The PN load signal indicates that the PN generator 15 should start over again on the 128 bit sequence generated thereby.

The high rate MUX sync 17 generates the sync bits that are inserted once every 16 bits in each of the I channel and Q channels in the HRM. The sync word for the I channel is a forward 7-bit Barker code while the Q channel sync is a reverse 7-bit Barker code. After each 7-bit Barker code has been transmitted, a ones' complement will be transmitted for the next 7-bit Barker code. This alternating Barker code scheme prevents the far end demultiplexer from erroneously locking up on a data pattern that is identical to the 7-bit Barker code sync.

The HRM-Sync 17 also produces the frame sync signal (FRMSN) which indicates when the 7-bit Barker sync bits are ready to start over (viz., every 128 data bits). The FRMSN signal is used to load the PN generator 15 at the correct time so that it will always have a known relationship to the sync and data bits in every frame. Since the PN generator bits occurring at the sync bit times are not always ones or zeros, it is necessary to modify the sync word bits when utilizing the PN code to assure that after Exclusive OR ADDing the two signals that the resultant is a pure 7-bit Barker code on the output. Therefore, the sync word bits are different if the PN code is being used. However, the resultant 7-bit Barker code on the output of the I or Q channel is identical whether the data streams are being randomized (Exclusive OR ADDing of the PN code) or sent clear (without randomizing).

In addition, the circuit includes Manchester encoder 18. Prior to Manchester encoding, the I and Q channel data are recombined into one very high rate data stream. It is this combined data stream that is Manchester encoded. This encoding requires data manipulation at four times the normal I or Q channel data rates. A Miller frequency modulation (MFM) which divides the Manchester encoded data in half is also generated from the Manchester encoded output and provided as output information.

Figure 2:
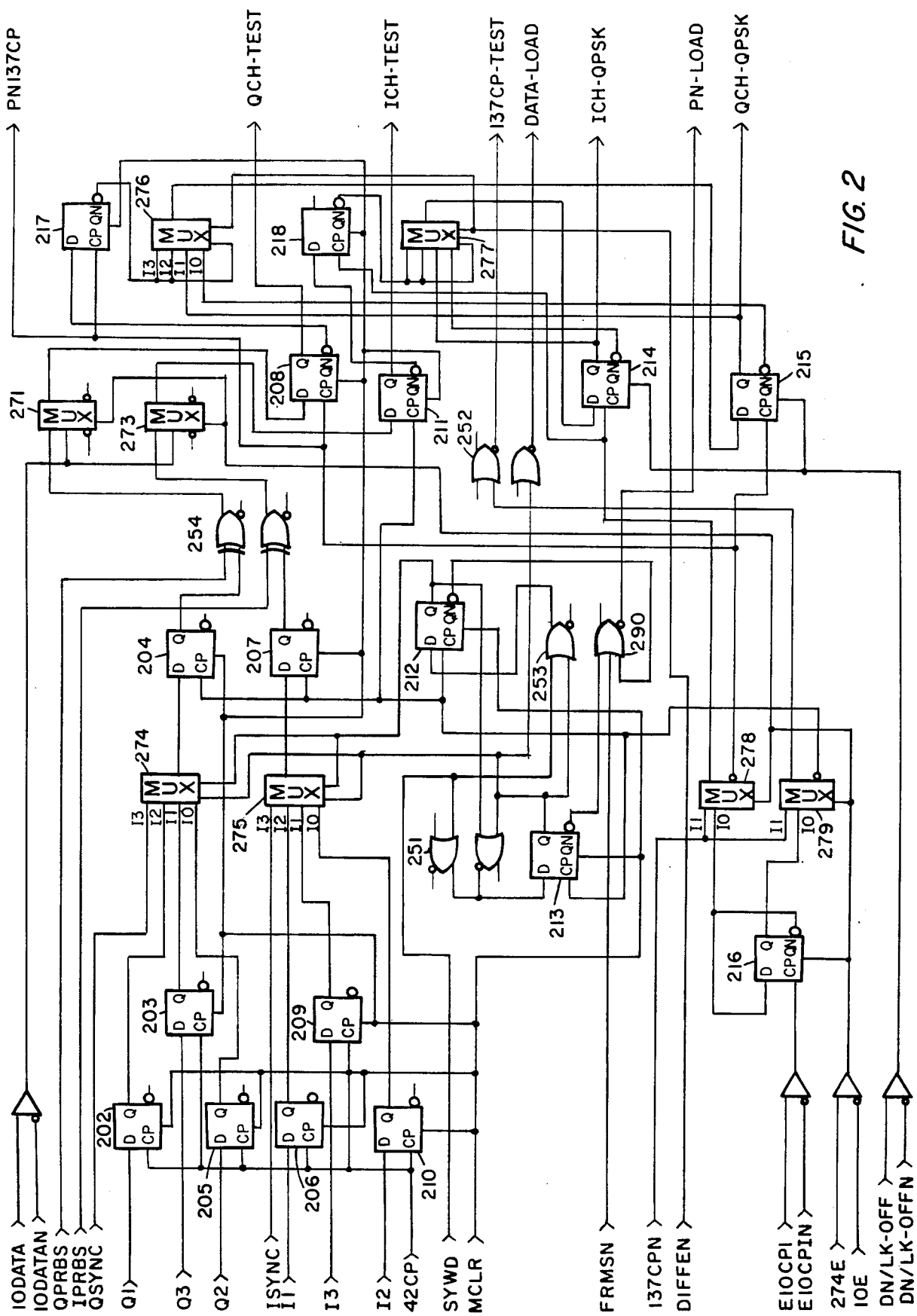
FIG. 2 is a logic diagram of the high rate multiplexer (HRM) of the instant invention.

Referring now to FIG. 2, there is shown a logic diagram of the high rate mux 16 which has the two modes of operation noted earlier, i.e. a narrowband mode and a wideband mode. In the narrowband mode of operation, the narrowband clock is supplied to the R3 line receiver. When the signals 1OE and 274E are high and low conditions respectively, the receiver R2 produces a low output and enables the narrowband mode of operation. This enables the portion of this circuit shown in the bottom part of the drawing to operate in the narrowband mode. Thus, flip-flop 216 receives the narrowband clock and divides it by two so as to generate the clock timing for the narrowband I and Q data streams. Muxes 278 and 279 are controlled by the narrowband or wideband of operation. When narrowband is selected, set input S to muxes 278 and 279 is low which enables the output from flip-flop 216 to pass therethrough and become the multiplexing clock. The S inputs to muxes 271 and 273 are also low which allows the received narrowband data to pass through these circuits and be clocked into flip-flops 208 and 211, respectively. Since flip-flop 216 has divided the narrowband clock by two and opposite clocks are enabled through muxes 278 and 279 to flip-flops 208 and 211, every other bit of the narrowband data will be clocked into flip-flop 208 while the other bits are clocked into flip-flop 211. This splits the narrowband data into both I and Q channel data streams. Flip-flop 208, which contains Q channel data is then clocked into flip-flop 21 one-half clock period later. Since the data in flip-flop 218 now leads the data in flip-flop 217 the 180° phase shift mentioned supra has been accomplished. Muxes 276 and 277 allow the data from flip-flops 217 and 218, respectively, to be differentially encoded or passed in the clear depending upon the state of the differential enable line (DIFFEN). If this line is high, differential encoding will not occur. If it is low, the data will be differentially encoded. The differential encoding scheme will be discussed infra in the wideband mode of operation. After passing through muxes 276 and 277, the narrowband I and Q data arrive at flip-flops 214 and 215. The output of flip-flop 214 is the I channel offset quadra-phase shift-keyed data while the output of flip-flop 215 becomes the Q channel offset quadra-phase shift-keyed data. In the narrowband mode of operation, data is passed through the system without the addition of sync bits. In the wideband mode of operation sync bits are added in the I and Q channel data streams.

Down link off (DN/LK-OFF) and its complement are received through line receiver R4 and allow the I and Q QPSK channels to be transmitted or totally shut off with no transitions. When DN/LK-OFF is high, the output of receiver R4 goes high which, in turn, holds a reset on flip-flops 214 and 215. This forces the outputs of these flip-flops to be in a continuous zero state until DN/LK-OFF is removed.

The master clear (MCLR) signal is used to condition all bistable components to a known condition so that computer simulations and electronic device testers can monitor circuit performance. This signal is not present or used during normal device operation.

Most of the circuitry shown in FIG. 2, is used in the wideband mode of operation. This mode is selected when the signal 274E is high and signal 1OE is low which produces a high level signal from receiver R2. The high level output of R2 will reset flip-flop 216, select the 137 MHz clock (137CPN) through muxes 278 and 279, as well as selecting the high rate I and Q data through muxes 271 and 273.

In the wideband mode of operation, the I1, I2 and I3 high rate data channels, as well as ISYNC are multiplexed into the composite I channel data. The Q1, Q2 and Q3 high rate data channels, as well as the QSYNC, are multiplexed into the composite Q channel data. Flip-flops 202, 203, 205, 206, 209 and 210 are buffers between the outputs of the 42 MHz APAs and the 137 MHz clock which is used to multiplex the composite I and Q data channels. It should be noted that all three flip-flops 202, 203 and 205 must each be sampled once by the 137 MHz for the Q channel prior to the next 42 MHz clock overwriting data into these flip-flops. Similarly flip-flops 206, 209 and 210 must be sampled by the 137 MHz clock prior to the next 42 MHz clock overwriting these flip-flops.

Muxes 274 and 275 are used to multiplex the I and Q data channnels. The Q channel is multiplexed through mux 274 while the I channel is multiplexed through mux 275. Muxes 274 and 275 are controlled by flip-flops 212 and 213 along with feedback OR/NOR gates 251 and OR gate 253. Flip-flops 212 and 213 perform a divide-by-three function at the 137 MHz clock rate until modified by the sync word bit time (SYWD) from the timer at which time the flip-flops perform a divide-by-four function. The divide by four function allows the insertion of the sync bit into the data streams once each 16 data bits. Starting with the end of the divide-by-four function, mux 274 will have the I3 input selected and will pass QSYNC to be sampled by flip-flop 204 at the 137 MHz rate. Following this, flip-flops 212 and 213 return to a divide by three functions for four times. Each divide-by-three function sequentially selects input I2 of mux 274, followed by input I0 and concludes with the selection of I1. This operation allows the contents of flip-flops 202, 203 and 205 to be passed through mux 274 and be sampled by flip-flop 204 at the 137 MHz clock rate in the sequence Q1, Q2 and Q3, repeated four times. The next sequence will be modified by SYWD which will allow Q1, Q2 and Q3 to be output followed by the QSYNC word bit. The above sequence will produce the 16 bit frame for the Q channel. The identical sequence is used for flip-flops 206, 209 and 210 through mux 275 to be sampled as the I channel by flip-flop 207 at the 137 MHz clock rate.

Exclusive OR gates 254 are used to Exclusive OR ADD PN generated sequences with the I and Q channels. If randomizing has been externally selected, the IPRBS and QPRBS inputs will include the repetitive 112 bit P/N code generated from the P/N generator input signal. The P/N generator P/N load, which reloads the P/N sequence every 112 bits, is generated from the decoding of flip-flops 212 and 213, along with frame sync (FRMSN) from the high rate mux sync circuitry through NOR gate 290, and transmitted to the P/N generator 15. The outputs of the P/N generators are Exclusive OR ADDed to the I and Q channels through Exclusive OR gates 254 to guarantee a good spectrum of data transitions on these channels. This is required to bit sync onto the data during down conversion and data/clock regeneration with circuitry at the far end of the link. The I and Q channel sync bits must remain unaltered by the randomizing process. Since ISYNC was altered by this process, the high rate mux sync generator changes the ISYNC so that it will appear unaltered by the randomizing process. The wideband mode of operation automatically selects the outputs of gates 254 to pass through muxes 271 and 273 directly to flip-flops 208 and 211. Flip-flops 208 and 211 are pipeline flip-flops which are used to maintain clock-to-data relationships at the 137 MHz clock rate. If randomizing is not selected, the P/N generator is cleared and its outputs (IPRBS and QPRBS) are both zero. When zero is Exclusive OR ADDed to the I and Q channels, they will remain unchanged by this process. Therefore, the unrandomized data out of flip-flops 208 and 211 will be identical to the data out of flip-flops 204 and 207 but delayed by one bit period of the 137 MHz clock.

The outputs of flip-flops 208 and 211 are used as the I and Q chanel test information. This is used to verify the validity of the composite I and Q channels. The QN outputs of flip-flops 208 and 211 are sampled at flip-flops 217 and 218. It will be noted that flip-flop 217 samples flip-flop 208 one clock period later, while flip-flop 218 samples flip-flop 211 one half clock period later. Thus, flip-flop 218 leads flip-flop 217 by one half clock period or 180°. This phase difference is maintained through the rest of the circuitry so that the I chanel QPSK data stream leads the Q channel QPSK data stream by 180° to the offset QPSK modulator. The QN output of flip-flop 217 is passed through mux 276 to flip-flop 215 where it is sampled on the next clock pulse. Mux 276 is used to allow the data passed therethrough to be differentially encoded or unmodified. When differential encoding is selected (DIFFEN is low), the S0 input to mux 276 is controlled by the state of output QN of flip-flop 217 while the S1 input is low. With flip-flop 217 output QN low, mux 276 input I0 is selected which feeds the flip-flop 215 QN output back to the input of flip-flop 215. This will cause flip-flop 215 to change state on the next clock pulse. When terminal QN of flip-flop 217 is high, input I1 of mux 276 is selected which feeds the Q output of flip-flop 215 back to the input of flip-flop 215. This will cause the flip-flop 215 to remain in the same state at the next clock pulse. It can be seen that differential encoding will cause the output flip-flop to change state for a data bit zero and remain in its previous state for each data bit one. When differential encoding is not selected, the output of flip-flop 217 will pass directly through mux 276 inputs I2 and I3 to be sampled by flip-flop 215 one clock period later. Flip-flop 214 samples flip-flop 218 through mux 277 in a similar way. If differential encoding is selected, mux 277 feeds back the outputs of flip-flop 214 through mux 277 in such a way as to cause differential encoding. If differential encoding is not selected, flip-flop 214 follows the QN output of flip-flop 218 one bit period later, through mux 277.

Figure 3:
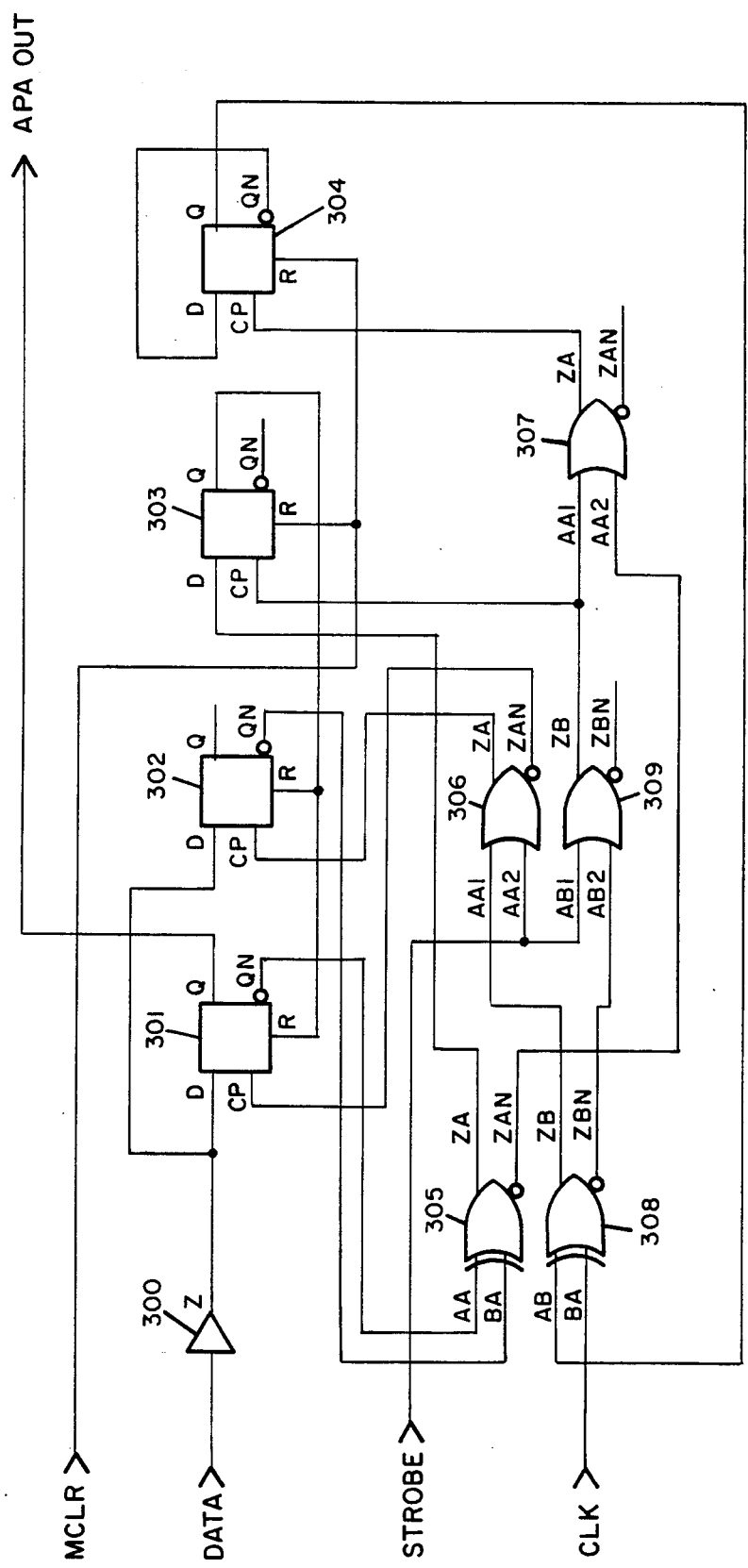
FIG. 3 is a logic diagram of the automatic phase adjuster (APA) of the system.

Referring now to FIG. 3, there is shown a more detailed logic circuit diagram of the automatic phase adjuster (APA) which bears reference numeral 11 in FIG. 1A. The data signals (DATA) from the user arrive at the APA at the data line receiver 300 and are presented at the D input of the flip-flops 301 and 302. The timing generating circuit 10 in FIGS. 1A and 4, supplies the clock signal CLK at the channel frequency. The STROBE signal supplied by timer 10 is at twice the channel frequency so that one STROBE signal is produced when the clock is low and another when it is high. Flip-flop 304 determines whether the STROBE will be allowed to pass through gate 306 to the flip-flops 301 and 302 during the high clock time or the low clock time. When the STROBE signal passes through gate 306 to the flip-flops, it will clock flip-flop 301 as signal ZAN on the leading edge of the STROBE signal and it will clock flip-flop 302 as signal ZA on the falling edge of the same STROBE signal. This permits sampling of the data twice, i.e. on both the leading edge and the trailing edge of the STROBE signal that is passed through the gating circuit which is controlled by the flip-flop 304. The states of flip-flops 301 and 302 will indicate if the DATA signal sampled on the leading edge and on the falling edge of the enabled STROBE has the same information or state. If the information is not the same, it is known that the DATA signal has changed from one state to another state during the enabled STROBE period. This means that data sampling is occurring during a transition time of the DATA signal. ExclusiveOR gate 305 monitors the states of flip-flops 301 and 302. So long as the outputs of these flip-flops are the same, the circuitry is permitted to continue to operate the way it has been operating. If, however, an ambiguity is detected, i.e. the situation wherein flip-flop 301 is at one state and flip-flop 302 is at a different state after the enabled STROBE time, the ExclusiveOR gate 305 produces a high output signal ZA which allows flip-flop 303 to set on the trailing edge of the next STROBE signal, (i.e. not the data sampling strobe). With flip-flops 301 and 302 in opposite states after the data STROBE, the same STROBE that set flip-flop 303 is able to pass through OR gate 307 as signal ZA which changes the state of flip-flop 304. The setting of flip-flop 303 will reset both flip-flops 301 and 302. This will disable any further strobes from clocking flip-flop 304 and will cause flip-flop 303 to reset on the next strobe.

It will be seen that the input AA and BA signals at OR gate 305 are the sampling signals of the flip-flops 301 and 302 which indicate whether the flip-flops are in the same or in opposite states. Exclusive OR gate 308 is used to invert or pass the true clock signal levels through to OR gates 306 and 304. The signal ZB from Exclusive OR gate 308 will always be the opposite level from ZBN. For example, if flip-flop 304 is set, then signal ZB from Exclusive OR gate 308 will appear as an inverted clock and signal ZBN will appear as the opposite or true clock. Since an OR gate is only enabled when the clock signal is low, it can be seen that OR gates 306 and 309 will be alternately enabled to pass the low going STROBE. The enabled STROBE at OR gate 306 terminal ZA will be present during low clock time if flip-flop 304 is reset. The enabled STROBE at OR gate 309 terminal ZB will be present during high clock time if flip-flop 304 is reset. The enabled STROBE signal from OR gate 306 terminals ZA and ZAN clocks flip-flop 301 on its leading edge and flip-flop 302 on its trailing edge. The OR gate 309 allows the other strobe (which did not clock these flip-flops) to clock the flip-flop 303. Flip-flop 303 remains in the reset state unless there has been an ambiguity on the flip-flops 301 and 302 (as discussed above). If the signals produced by these flip-flops are not the same after the enabled STROBE time, then flip-flop 303 sets on the next STROBE. As long as flip-flops 301 and 302 are at the same level through the exclusive OR gate 305, the ZAN signal will be high at the input to gate 307 which inhibits clocks to flip-flop 304. Conversely, when the output signals from flip-flops 301 and 302 are opposite, a low level is supplied to OR gate 307 input terminals AA2. This condition allows the clock pulse at OR gate 309 terminal ZB to be gated through gate 307 as the clock pulse CP to change the state of flip-flop 304. When that flip-flop changes state, it will enable the opposite strobe-to-clock signal relation to be used inside the APA.

In the operation of the APA, it is important that once flip-flops 301 and 302 achieve opposite states and allow the clock pulses of flip-flop 303 and flip-flop 304 to occur, flip-flops 301 and 302 must be cleared by application of a reset signal at terminal R. This also disables Exclusive OR gate 305 signal ZAN before another clock pulse occurs at OR gate 307 terminal AA1. If the flip-flops 301 and 302 are allowed to remain in the opposite states, another clock will be produced at flip-flop 304 which causes the APA timing to return to its original timing. Thus, the timing is important in that only one clock can be applied to flip-flop 304 before flip-flop 303 sets and clears flip-flops 301 and 302 which in turn disables any further clocks to flip-flop 304.

Figure 4:
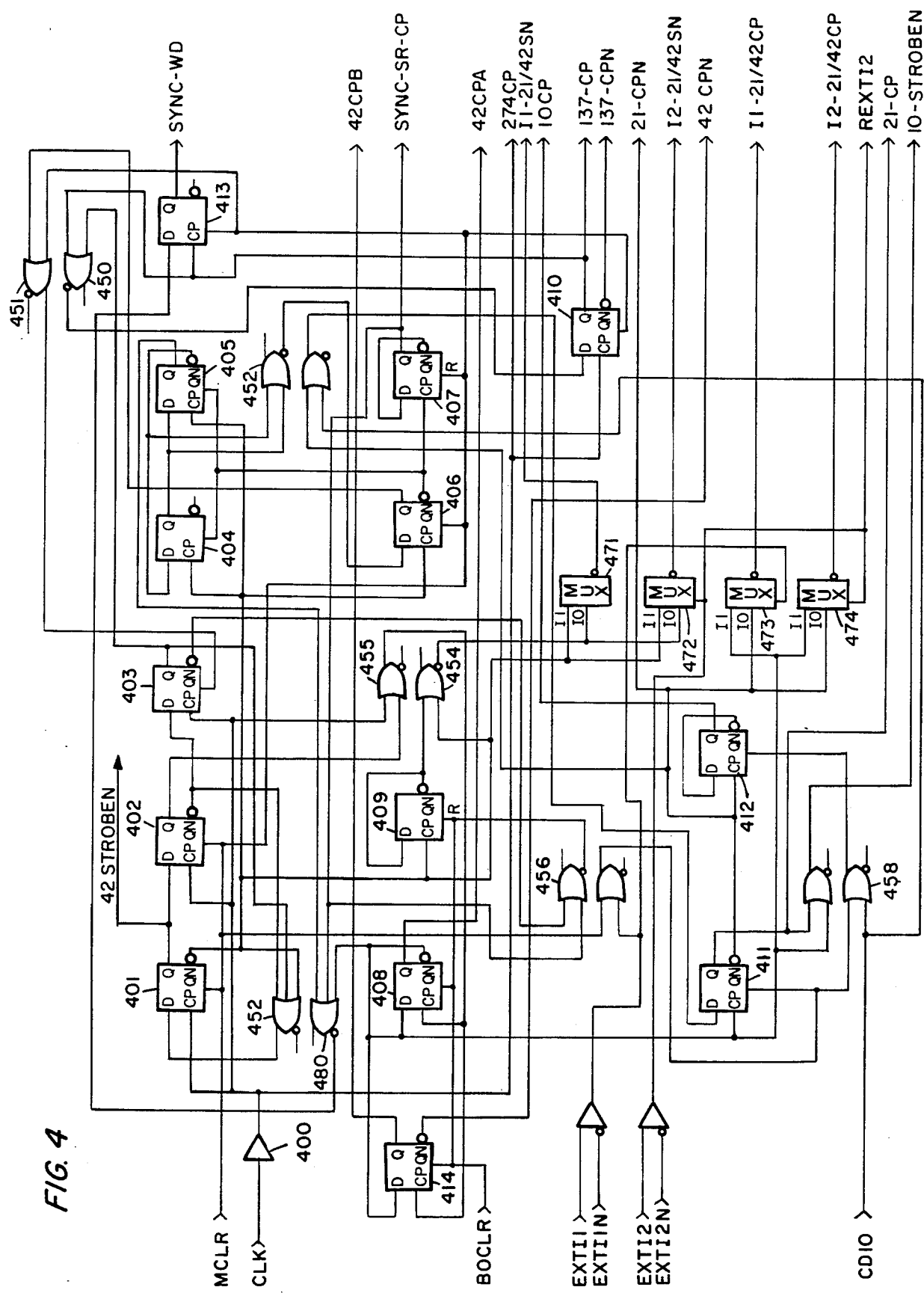
FIG. 4 is a logic diagram of the timer of the instant invention.

Referring now to FIG. 4, there is shown a logic diagram of the timer portion of the instant invention. The timer receives the high rate clock signal CLK through the driver buffer 400. The buffer 400 output supplies the internal clock to flip-flops 401, 402 and 403. Flip-flops 401 and 402 are arranged to divide by 3 for four times and then divide by 4 the fifth time. Every time these flip-flops divide by 4 (i.e. the fifth dividing time), they slip half of a 137 MHz clock cycle. More particularly, the circuit slips half of a 137 MHz clock cycle every 8 bits. Thus, during a 16-bit time period, one additional 137 MHz bit period has been created into which one sync bit can be inserted.

In addition, flip-flop 401 generates the APA STROBE used for the high rate channels. Flip-flop 402 enables the master clock to toggle flip-flops 408 and 414 which in turn generate the high rate channel clocks 42CPA, 42CPB and 42CPN . Flip-flops 404, 405 and 406 perform a divide-by-fives function which permits flip-flop 403 to set once every five cycles of flip-flops 401 and 402. The setting of flip-flop 403 enables the half cycle slip (change from divide-by-three to divide-by-four) every fifth cycle of flip-flops 401 and 402.

In operation, the clock signal CLK is applied to flip-flop 410 which divides the clock signal by 2 and generates a 137 MHz clock signal. This signal is also synchronized through OR gate 450 as signal ZBN which synchronizes the 137 MHz clock pulse to the 42 MHz clock (high rate channel clocks) such that they are locked together whereby the 137 MHz clock does not run at random in relation to the 42 MHz clock. The ZB output signal of gate 451 is supplied to the reset terminal of flip flop 403 to control when the flip-flop is allowed to set. That is, only when flip-flop 403 can set is it possible to obtain the extra divide-by-four rather than the divide-by-three out of the flip-flops 401 and 402. Flip-flop 402 is strictly a follower of flip-flop 401 so that whatever flip-flop 401 does, flip-flop 402 follows one clock period later.

The feed back circuitry that generates the divide-by-three or divide-by-four is Exclusive OR gate 452 which receives three inputs from the QN outputs of flip flops 401 and 402 as well as the Q output of flip-flop 403, respectively (The QN signal is the complement of the related Q signal.) These signals control when flip flop 401 should divide-by-three or when it should divide-by-four (via the feed back loop). The Q signal from flip-flop 401 is the 4 MHz STROBE.

Inasmuch as I1 and I2 may be high rate users or multiplexed up from lower rate users, the APA clocks and strobes must be selectable between 42 MHz and 21 MHz. Muxes 471, 472, 473 and 474 are used to perform this selection. The 42 MHz strobe comes from the QN terminal of flip-flop 401 to muxes 471 and 472. The 21 MHz strobe from the ZBN terminal of NOR gate 454 is also supplied to muxes 471 and 472. The output of mux 471 is controlled by the external signal EXTI1. When EXTI1 is high, the I1 channel data consists entirely of data received from a high rate user. When the signal EXTI1 is low it forces I1 to be multiplexed from lower rate users and the output strobe to the APA changes from a 42 MHz strobe to the half rate 21 MHz strobe through mux 471. Mux 472 has identical inputs to mux 471 except that the output is selected by external control signal EXTI2. Whenever EXTI2 is high, the 42 MHz strobe is output from mux 472 and when EXTI2 is low the 21 MHz strobe will be output. Muxes 473 and 474 receive inputs from the QN terminals of flip-flop 408 (42 MHz clock) and flip-flop 411 (21 MHz clock). Mux 473 outputs the 42 MHz clock when EXTI1 is high and the 21 MHz clock when EXTI1 is low. Similarly, mux 474 outputs the 42 MHz clock when EXTI2 is high and the 21 MHz clock when EXTI2 is low.

The HRM sync timing information is generated by decoding flip-flops 404, 405, 406 and 407. The ZA output of OR gate 452 generates a signal once every 8-bits -which is sampled by flip-flop 406. This, in turn, clocks flip-flop 407 (via terminal QN) which divides the incoming signal by 2 and produces the sync shift register clock pulse (SYNC SRCP). This occurs once every 16 bits of the 137 MHz data frame and is used to clock the sync shift register so that it will bring a new bit of information up for the next sync bit. The sync word in this device is distributed. That is, it is inserted into the frame once every 16 bits rather than in a continuous block form with the data following. The sync bit insertion timing (SYNC-WD) is supplied by the ZBN output of NOR gate 480 which is sampled by flip-flop 413. This signal sequence provides the timing to determine during exactly which bit in the frame the sync bit will be inserted. Once every 16 bits of the 137 MHz clock, flip-flop 413 is set for one bit period which allows the sync word bit to be slipped into the data frame at that time.

Flip-flops 408 and 414 are the 42 MHz clock generators. That is, flip-flops 408 and 414 receive the respective D input signals from flip-flop 408 to provide a divide-by-two circuit. These flip-flops receive their clock signals from the ZA output of NOR gate 455 which receives a combination of the 274 MHz clock supplied as an input to the device and the 42 MHz times two signal from flip-flop 402. The outputs of flip-flops 408 and 414 are the 42 MHz clock signals CPA and CPB, respectively which are used as high rate user data channel clocks (i.e., the I1, I2, I3, Q1, Q2 and Q3 channel clocks). These signals are supplied to the users to clock information back into the system. Also, these signals are produced at the frequency at which the high rate user channel data is put into the aggregate data stream. Flip-flop 409, in conjunction with OR gate 454, divides the 42 MHz strobe by 2, thus, generating the 21 MHz strobes discussed above.

NOR gate 456 is used, primarily, for synchronizing and is representative of the method by which clock circuitry synchroniziation occurs. All clocks produced by the timer are synchronized to each other. Clocks generated in the timer have a given relationship that remains constant during operation. The built in synchronizing circuitry maintains the proper clock relationships. Flip-flop 411 divides the 42 MHz clock signal by 2 which generates the 21 MHz clock pulse. Flip-flop 412 divides the 21 MHz clock signal by 2 which generates the 10 MHz clock pulse 10CP for the users when sub-multiplexing the I1 and/or the I2 channels. The 10 MHz strobe signal (10-STROBEN) is generated at terminal ZA of OR gate 459 and it is a combination of the 21 MHz clock and the 42 MHz clock.

The signal CD1O is a synchronizing pulse that is supplied to inputs of gates 458 and 481 from the medium rate MUX described infra. When channels I1 and I2 are being submultiplexed, they are also synchronizing to the timer via the CD10 input.

The master clear signal MCLR is used, inter alia, to force all the flip-flops to known states. This is required for computer aided simulation and subsequent test.

Figure 5:
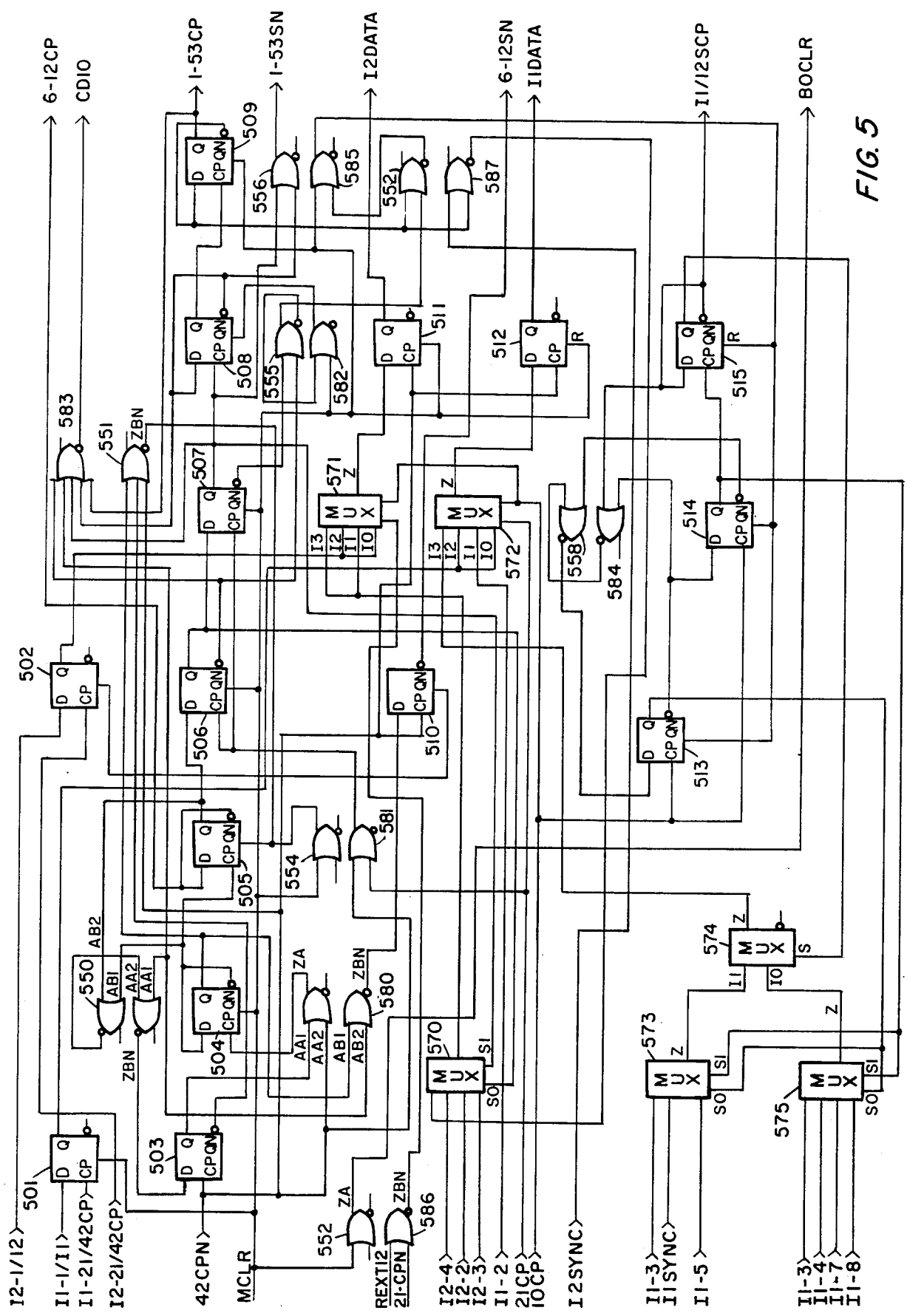
FIG. 5 is a logic diagram of the medium rate multiplexer circuit (MRM) of the instant invention.

Referring now to FIG. 5, there is shown a logic diagram of the medium rate mux (MRM) portion of the system. The medium rate mux is used especially when the system is sub-multiplexing the lower 8 channels (see FIG. 1) into the I1 and/or the I2 data stream. The D input to the flip-flop 501 is either the 42 MHz aggregate information on the I1 (when not in the sub-multiplexing mode) or is the 21 MHz data from APA 11 (see FIG. 1) in the sub-multiplexing mode. The clock signal I1-21/42CP for flip-flop 501 is selected through mux 473 in the timer circuit. When the signal EXTI1 is high, the output from the timer circuit is a 42 MHz strobe and clock which is supplied to APA 11 which will receive all of I1 data from the user. When EXTI1 is low, the clock and strobe to APA 11 will change from 42 MHz to 21 MHz. The received 21 MHz data from the user will then be clocked into flip-flop 501 after passing through APA 11.

Flip-flop 502 has the same function for the I2 channel. When EXTI2 is high, muxes 472 and 474 in the timer circuit will select the 42 MHz clock and strobe and apply this to APA2 which will cause all of the I2 data to come from the user. When EXTI2 is low, the 21 MHz clock and strobe to APA2 is selected and causes the 21 MHz data received from the user through APA2 to be clocked into flip-flop 502. The major function of the medium rate mux is to multiplex the I1 and/or I2 channels from a number of low rate users. In the case of I1, the low rate users consist of one 21 MHz channel, one 10 MHz channel, 6 each 1.5 MHz channels and one sync bit for each 28 bits of data. When I2 is being submultiplexed, it will consist of one 21 MHz channel, 3 each 5 MHz channels, one unused 1.5 MHz bit and one sync bit for every 28 bits of data.

The 42 MHz clock signal, 42 CPN, from the timer is supplied to flip-flops 503, 510, 511 and 512. It is also gated through OR gate 553 at the terminal ZA to flip-flop 504. Flip-flops 503, 504 and 505 along with OR gate 550 divide the 42 MHz input clock to produce the 6 MHz clock signal, 6–12CP. Flip-flops 503, 504, 510 and NOR gate 580 are used to produce the 6 MHz strobe, 6–12 SN. Both the 6 MHz clock and strobe are used to time the three 6 MHz APA's to provide the 6 MHz data for I2.

Flip-flops 506 and 507 receive a gated 42 MHz clock through terminal ZB of OR gate 581. Flip-flops 506, 507, 508 and 509 along with OR gates 555 and 582 fulfill two functions. One function is to divide the gated clock input at terminal ZB of OR gate 581 by fourteen thereby to create the 1.5 MHz clock. The other function is to produce CD10 at the ZAN output terminal of NOR gate 583 to synchronize the timer circuitry to the medium rate mux circuitry. The outputs of flip-flops 507 and 508 are decoded through OR gate 556 to produce the 1.5 MHz strobe at terminal ZAN. The 1.5 MHz clock and strobe are sent to APA's where the 1.5 MHz user data is received and synchronized to be multiplexed into the I1 channel.

Flip-flops 513, 514 and 515, along with NOR gates 558 and 584 are used to generate the control signals for the 1.5 MHz muxes (i.e. muxes 573, 574 and 575). These flip-flops are also used to generate the clock (I1/I2 SCP) for both the I1 and I2 sync generating circuitry. OR gate 557 (at terminal ZAN) and OR gate 585 (at terminal ZB) are used to synchronize these flip-flops to the previously generated 1.5 MHz clock.

Flip-flop 512 and muxes 572, 573, 574 and 575 control the generation of the I1 channel data. When the EXTI1 input signal to the timer is high, both the 10 MHz clock (10CP) and the 21 MHz clock (21CP) are held at a continuous low level. Since EXTI1 high forces I1 to consist entirely of 42 MHz data from the user through APA 1, there is no requirement for the 10 MHz and 21 MHz clocks to be active. However, with 10CP and 21CP both low, the I0 input through mux 572 is enabled continuously. Therefore, the 42 MHz user data from APA 1 through flip-flop 501 is continuously presented through mux 572 to flip-flop 512 where it is sampled as the I1 channel data (I1 data). With EXTI1 low, the 10 MHz (10CP) and 21 MHz (21CP) clocks will resume operation, as well as select the 21 MHz clock and strobe the APA 1 through the timer. In this mode of operation, flip-flop 501 receives 21 MHz user data from APA 1.

The sub-multiplexed I1 data channel consists of 14 bits of 21 MHz data, 7 bits of 10 MHz data, 6 bits of 1.5 MHz data and 1 bit of sync data every 28 bit frame. It can be seen that the output of mux 572 is selected by the 10CP and the 21CP input signal. Thus, when signals 21CP and 10CP are both low, one 21 MHz data bit from flip-flop 501 through I0 of mux 572 will be sampled at a 42 MHz rate by flip-flop 512. With 21CP high and 10CP low, one 10 MHz data bit (I1-2) is selected from the 10 MHz APA through I1 of mux 572 to flip-flop 512 to be sampled by the second 42 MHz clock pulse. When the 21CP is low and the 10CP is high, the next 21 MHz data bit from flip-flop 501 through I2 of mux 572 will be sampled by the third 42 MHz pulse at flip-flop 512. With 21CP high and 10CP high, the output of mux 574 passes through the I3 input of mux 572 and is sampled by flip-flop 512 with the fourth 42 MHz clock pulse. This sequence repeats every four clock periods of the 42 MHz clock when I1 is being sub-multiplexed. Muxes 573, 574 and 575 are controlled by flip-flops 513, 514 and 515. Every four bit period of the 42 MHz clock, a new control state is produced by flip-flops 513, 514 and 515. Starting with the I1 sync, the next state will enable I1-3, then I1-4 and continue up to I1-8 being enabled through muxes 573, 574 and 575. Since there are seven of these inputs and they occur every fourth clock of the 42 MHz clock, an I1 submultiplexed frame consists of 28 bits (4×7=28). After 28 bits, SYNC will be enabled again starting the next frame of 28 bits.

Muxes 570 and 571, along with flip-flop 511, control the generation of the I2 channel data. When signal EXTI2 input is high, it will force the NOR gate 586 channel data at terminal ZBN to be low which in turn holds mux 571 select terminal S0 low. This allows the output of flip-flop 502 to pass through the I0 input of mux 571 when 10CP is low and through the I2 input of mux 571 when 10CP is high. Thus, flip-flop 502 is continually sampled by flip-flop 511 through mux 571 with the 42 MHz clock. When EXTI2 high in the timer, the 42 MHz clock and strobe are enabled to APA which receives and synchronizes the 42 MHz user data prior to being loaded into flip-flop 502.

The sub-multiplexed I2 data channel which is enabled when EXTI2 is low, consists of 15 bits of 21 MHz data, 4 bits of 6 MHz data (I2-2), 4 bits of a second 6 MHz data (I2-3), 4 bits of a third 6 MHz data (I2-4), one unused bit that is always low and one sync bit for every 28 bit frame. The output of mux 571 is selected by 21CPN (inverted through NOR gate 586) when EXTI2 is low. This is equivalent to 21CP which is applied to the S0 terminal of mux 571 and 10CP which is applied at terminal S1 of mux 571. With 21CP low (i.e. 21CPN inverted through NOR gate 586) and 10CP low, the output of flip-flop 502 is passed through mux 571 input terminal I2 to flip-flop 511 where it is sampled by the third 42 MHz clock period. When both 21CP and 10CP are high, the output of mux 570 is enabled through input I3 of mux 571 to flip-flop 511 where it is sampled by the fourth 42 MHz clock period. Mux 570 is controlled by flip-flops 506 and 507. The states of these flip-flops will change every two clock periods of the 42 MHz clock. At the beginning of a frame, SYNC is enabled through both NOR gate 587 (because NOR gate input AB1 is low) and input I3 of mux 570. Next, I2-2 is enabled through input I1 mux 570, followed by I2-3 through input I0 of mux 570 and then I2-4 is enabled through input I2 of mux 570. Each of these conditions will be present for two clock periods of the 42 MHz clock. After I2-4 has been enabled the first time, mux 570 controls repeat the sequence I2-2, I2-3 and I2-4. At the conclusion of the second I2-4 bit, mux 570 enables its I3 input which passes the unused bit as a low level signal because the signal at the input terminal AB2 of NOR gate 557 is high thereby forcing its output low. Mux 570 then enables I2-2, I2-3 and I2-4 each twice more which completes the 28 bit I2 sub-multiplexed frame.

Figure 6:
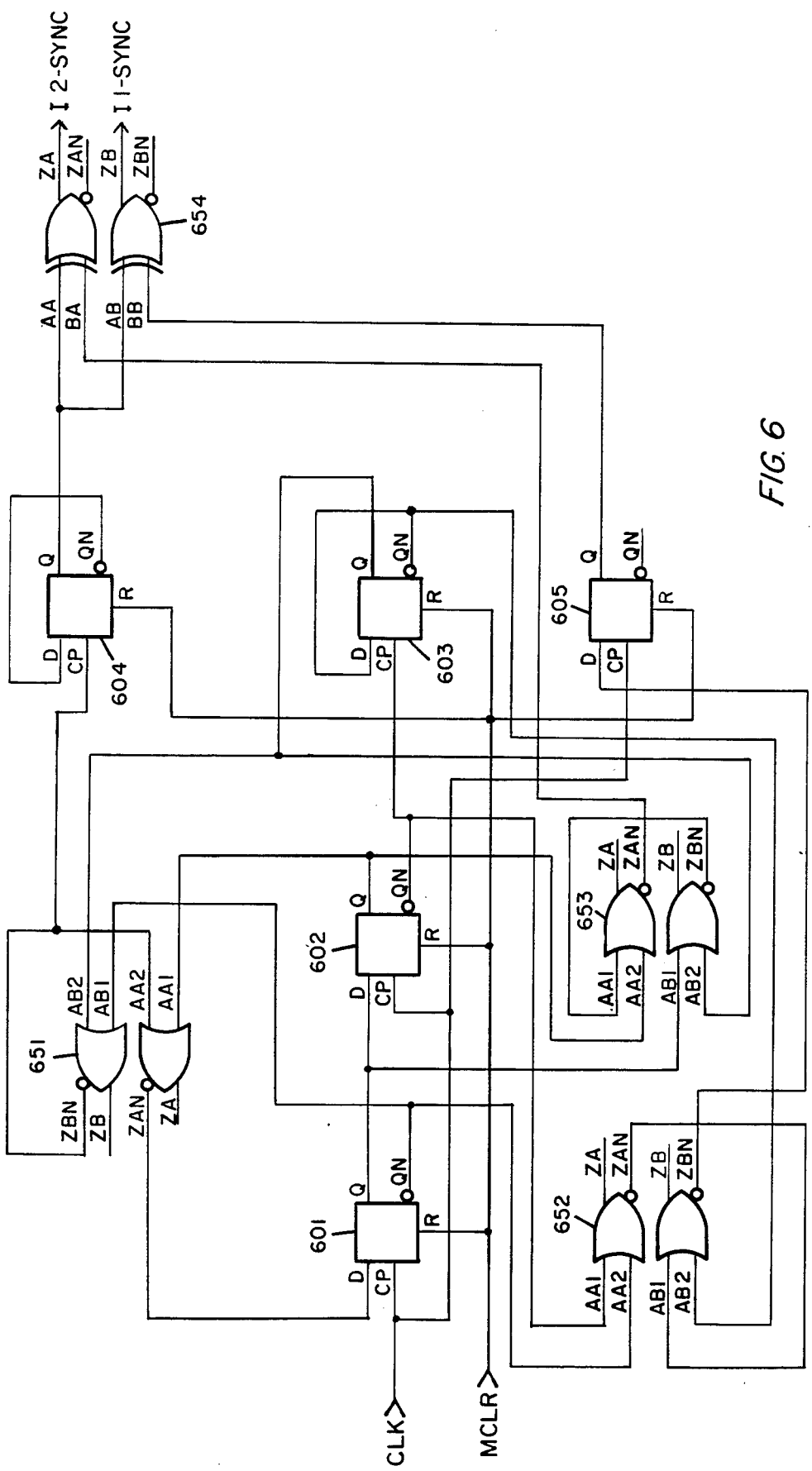
FIG. 6 is a logic diagram of the medium rate multiplexer synchronizer (MRM-Sync) of the instant invention.

Referring now to FIG. 6, there is shown a logic circuit diagram of the medium rate mux sync circuit which is used to generate the alternating Barker code for both the I1 and the I2 channels. This circuit generates a 1110010 pattern that goes out on the I1 channel. The reverse pattern, viz., 0100111, is supplied to the I2 channel. Both the I1 and I2 28 bit frames occur at a 1.5 MHz repetitive rate. The clock from the MRM (I1/I2SCP) to the medium rate mux sync circuitry occurs at the rate of 1.5 MHz. In other words, after every 28 bits of the I1 or I2 channels, a new sync word bit is made available. Flip-flops 601, 602 and 603, along with feed back NOR gates 651 are used to generate a divide-by-seven function. Flip-flops 601, 602 and 603 are decoded through NOR gates 652 to generate the I1 sync pattern 1110010. The I2 sync pattern is generated by decoding flip-flops 601, 602 and 603 through NOR gates 653 to produce the pattern 0100111. Flip-flop 605 is included in the I1 sync pattern path to delay this signal by one bit so the I1 sync pattern and the I2 sync pattern align properly.

Flip-flop 604 is allowed to change states at the end of each seven bit Barker sync generation. Since the output of flip-flop 604 is Exclusive OR ADDed to the I1 and I2 sync word bits through Exclusive OR gates 654, one seven bit Barker code will be transmitted as it is generated (when flip-flop 604 is reset) and the next seven bit Barker code will be sent as the 1's complement (when flip-flop 604 is set). For example, the I1 sync word is 1110010 for seven bits and then the 1's complement, or 0001101, for the next seven bits. The alternating of the sync word bits every other seven bits prevents the far end demultiplexer from locking up falsely on a constant data pattern that is identical to the seven bit Barker code used as SYNC.

Figure 7:
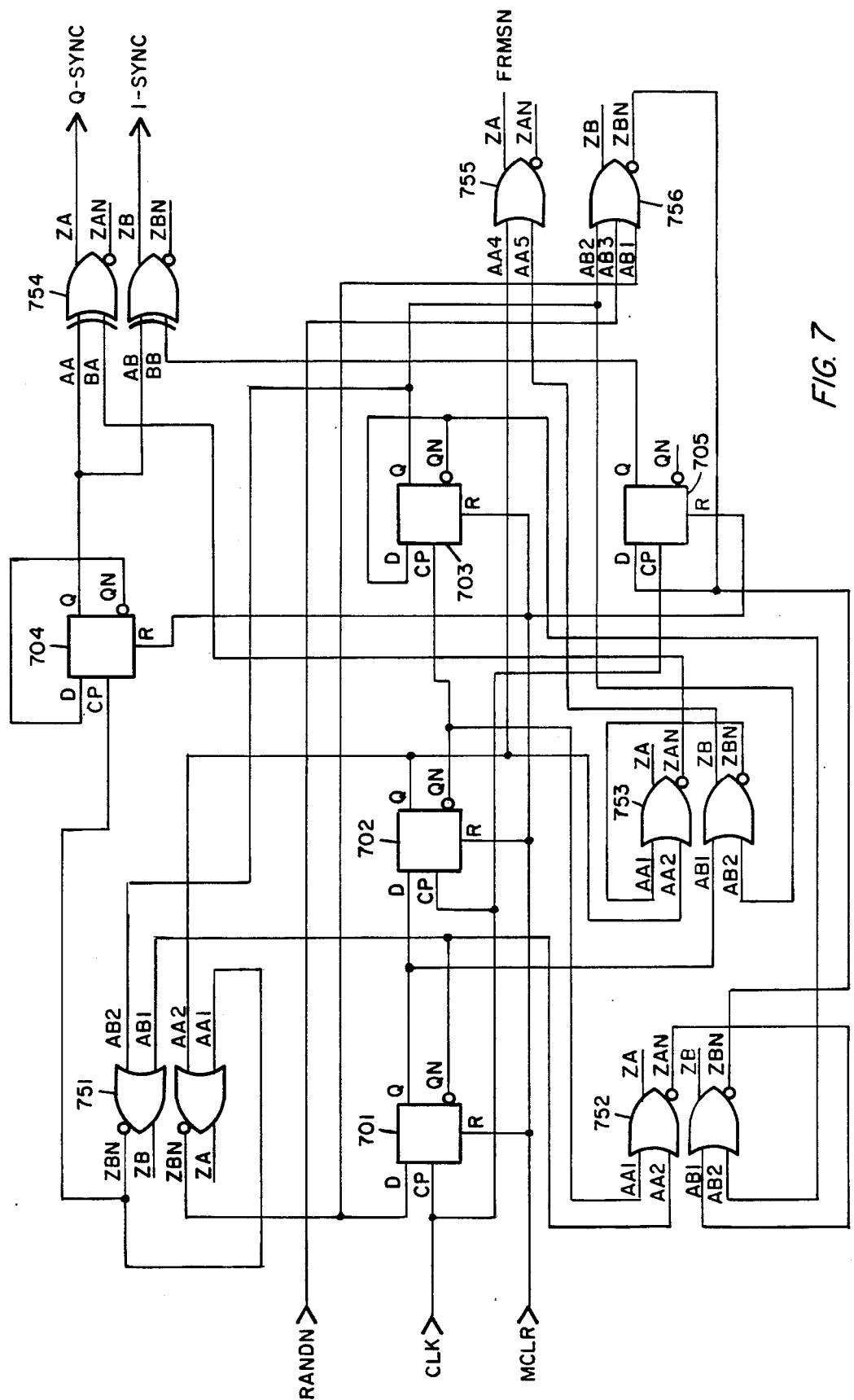
FIG. 7 is a logic diagram of the high rate multiplexer synchronizer (HRM-Sync) of the instant invention.

Referring to FIG. 7, there is shown a logic diagram of the high rate mux sync circuit which operates on the same principle as the medium rate mux sync described above. The Barker codes are exactly the same. In this instance the I1 channel picks up a 1110010 pattern for its sync whereas the Q channel sync picks up the opposite of that pattern, i.e. a 0100111. Flip-flops 701, 702 and 703, along with feed back NOR gates 751, are used to generate a divide-by-seven function. The clock pulse from the timer to the high rate mux sync generator occurs once for every 16 bits of the 137 MHz clock signal, because the timer slips channel clocks so that a sync bit may be inserted once in every 16-bit frame of the I or Q multiplexer. The states of flip-flops 701, 702 and 703 which are decoded through NOR gates 753, generate the Q sync pattern (which is 0100111) and repeats every seven bits. The states of flip-flops 701, 702 and 703 which are decoded through NOR gates 752 generate the 7-bit I sync pattern (i.e., 1110010). Again, since the I sync pattern leads the Q sync pattern by one bit, flip-flop 705 is used to delay the I sync pattern in order to properly align the I and Q sync patterns. Flip-flop 704 changes state once each 7-bit sync pattern has been completed. The Exclusive OR ADDing of flip-flop 704 to the I and Q sync patterns through Exclusive OR gate 754 results in the alternating of the sync bits similar to the medium rate mux sync generator.

The gates 755 and 756 have two functions in this circuit. OR gate 755 produces the frame sync (FRMSN) signal on terminal ZA once every seven bit sync word. This signal is used to restart the P/N generator signal that becomes Exclusive OR ADDed to the I and Q channel data when randomizing is externally selected. NOR gate 756 is used to modify the I channel sync when randomizing has been selected. The P/N code that is used to Exclusive OR ADD to I and Q results in a zero value bit opposite each Q channel sync bit. Therefore, the Q channel sync is not modified by the randomizing of its data stream. However, there are five bits in the I channel sync locations that are modified by the random function. Whenever randomizing has been selected, the I channel sync must be modified by NOR gate 756 to appear as 0111101 so that after randomizing it will appear as 1110010.

Figure 8:
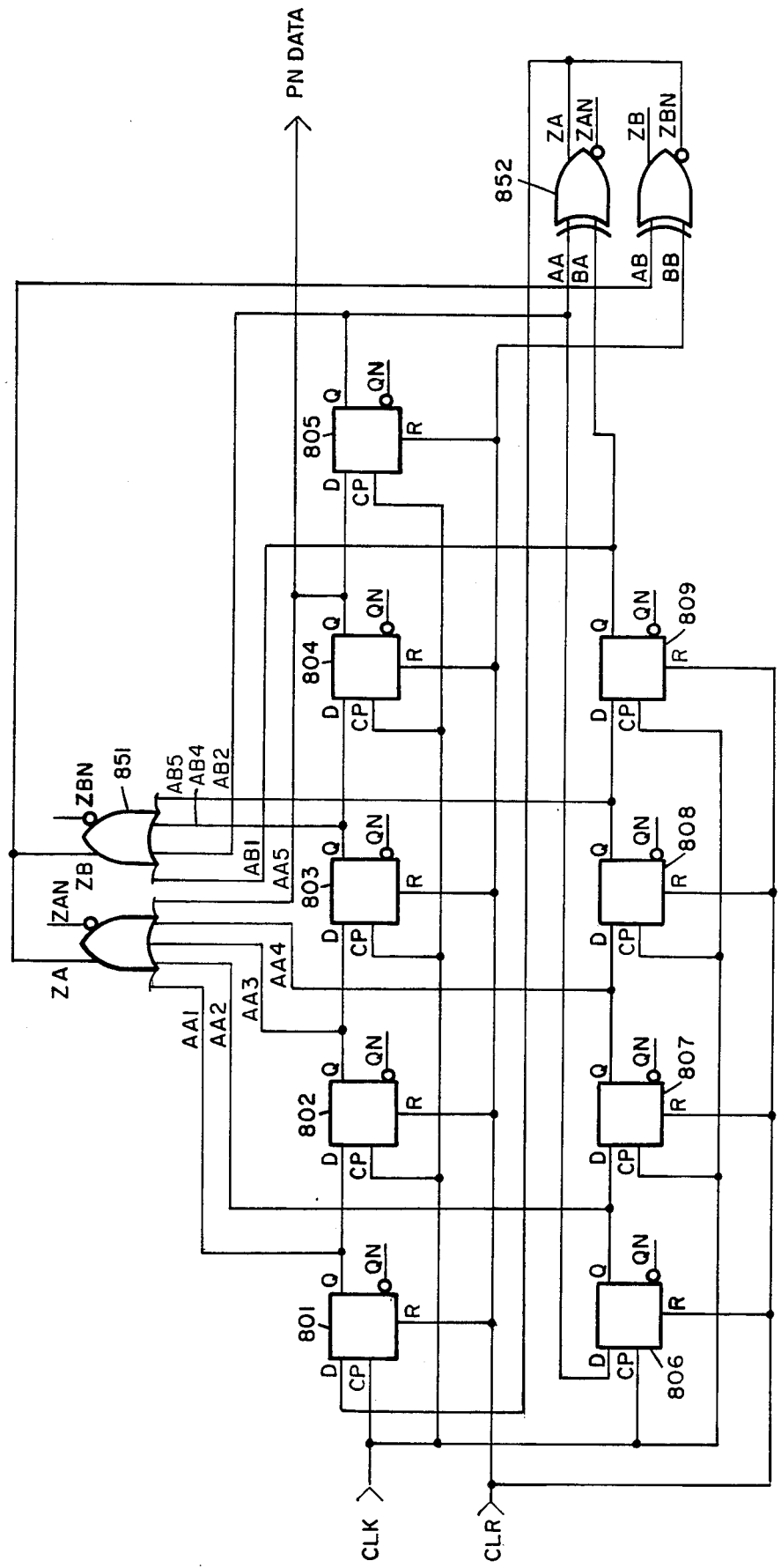
FIG. 8 is logic diagram of the external pseudo-number generator (PNEXT) of the instant invention.

Referring now to FIG. 8, there is shown a logic diagram of the external PN generator circuit which receives a clock from the outside world. By definition, a PN generator has a linear feedback shift register configuration. To generate the maximum sequence from this arrangement, the most significant flip-flop, in this case flip-flop 809, must be Exclusive OR ADDed to another flip-flop, in this case flip-flop 805, and the result fedback to the input of another flip-flop, in this case flip-flop 801. By tapping flip-flops 801 through 809 in the matter described above and feeding back to flip-flop 801, the Hewlett Packard 3780 $2^9-1$ PN code is duplicated. Every PN generator has one forbidden code. In this case it is the all zero state for each of the flip-flops. If this state occurs the PN code will remain in the all zero state unless provisions are made to detect and correct this situation. OR gates 851 monitor all the flip-flops for an all zero state. If this condition occurs, input AB of Exclusive OR gate 852 will go low. Inasmuch as CLR is also low, the output ZBN of gate 852 will go high which forces the D input of flip-flop 801 to go high. The next clock CLK will set flip-flop 801 and the all zero state will be removed so the sequence can resume normal operation.

Figure 9:
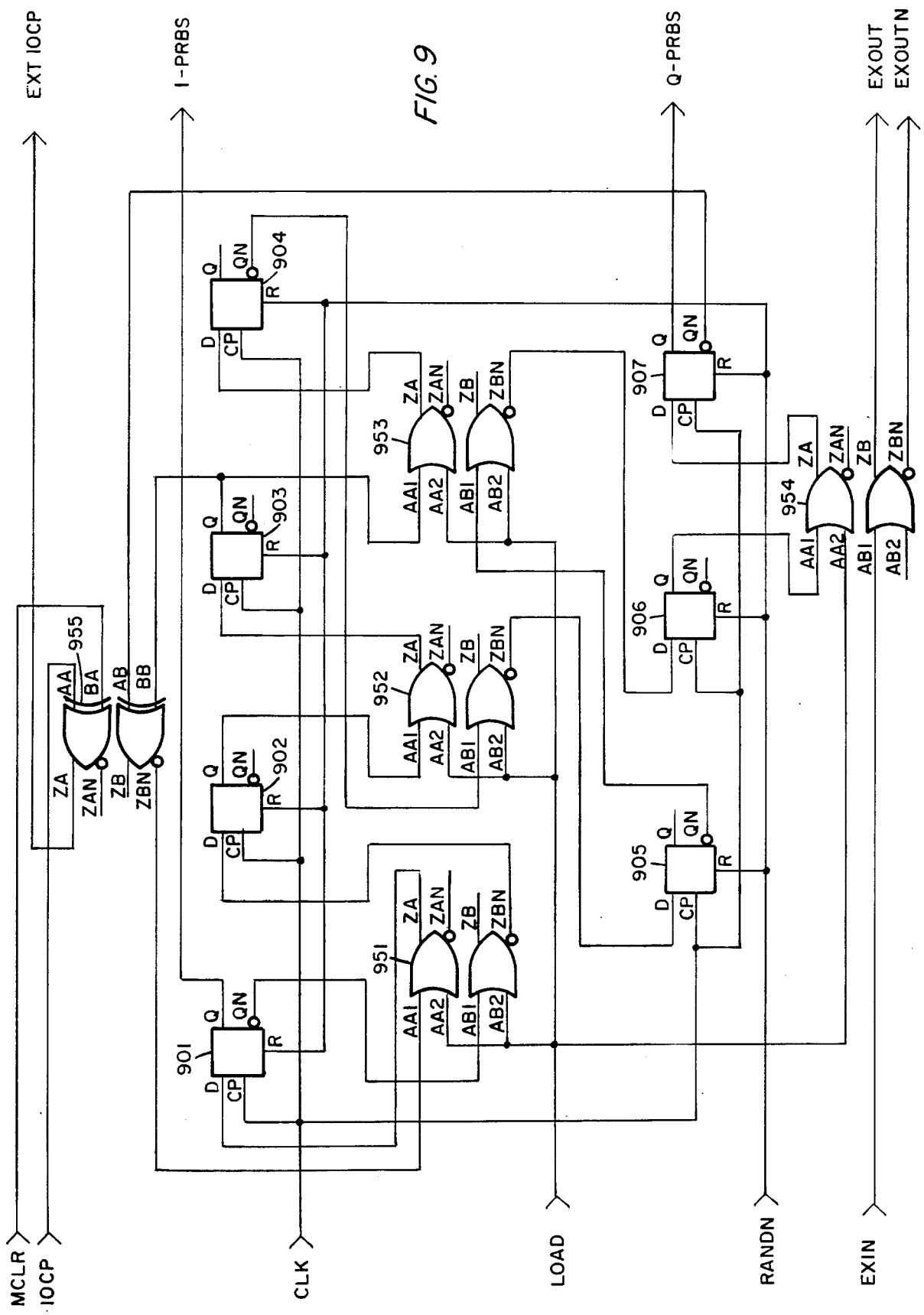
FIG. 9 is a logic diagram of the internal pseudo noise generator (PNGEN) of the instant invention.

Referring now to FIG. 9, there is shown a logic circuit diagram of a random pseudo-number generator. This PN generator contains seven flip-flops 901 through 907 which, along with Exclusive OR gate 955, form a linear feedback shift register. By using seven flip-flops, the sequence is capable of generating a $2^7-1$ or 127 bits of PN code. When randomizing is selected, a code length of 7×16 or 112 bits of known PN code are required to be able to maintain the sync bit in the clear and de-randomize the data at the other end of the data link. The LOAD pulse from the high rate mux is used to reload the PN generator back to a known beginning state every 112 bits. By doing this, the PN code always has a known relationship to the sync bits and every other bit during each 112 bit sequence. OR gates 951, 952 and 954 are used to control the loading or sequencing of the linear shift register flip-flops 901 through 904 or 905 through 907. Since this sequence is reloaded to a known state every 112 bit periods, there is no need to detect and correct the forbidden state of all zeros. In fact, when the randomizing function is disabled, all of the flip-flops are maintained in their reset state by the RANDN signal. This causes a continuous zero to be output to the high rate mux through the I-PRBS and Q-PRBS lines. When the continuous zero is Exclusive OR ADDed, the I and Q data streams will remain unaltered because Exclusive OR ADDing 0 to any bit leaves that bit unaltered. Both of the I-PRBS and the Q-PRBS signals consist of the identical PN code except the I-PRBS leads the P-PRBS by seven bit periods.

This feed back circuitry has been simplified for gate array implementation. Typically, it would be done with shift registers and with feed back through external Exclusive OR gates. In this case, the circuit is streamlined and minimized for gate array implementation.

Figure 10:
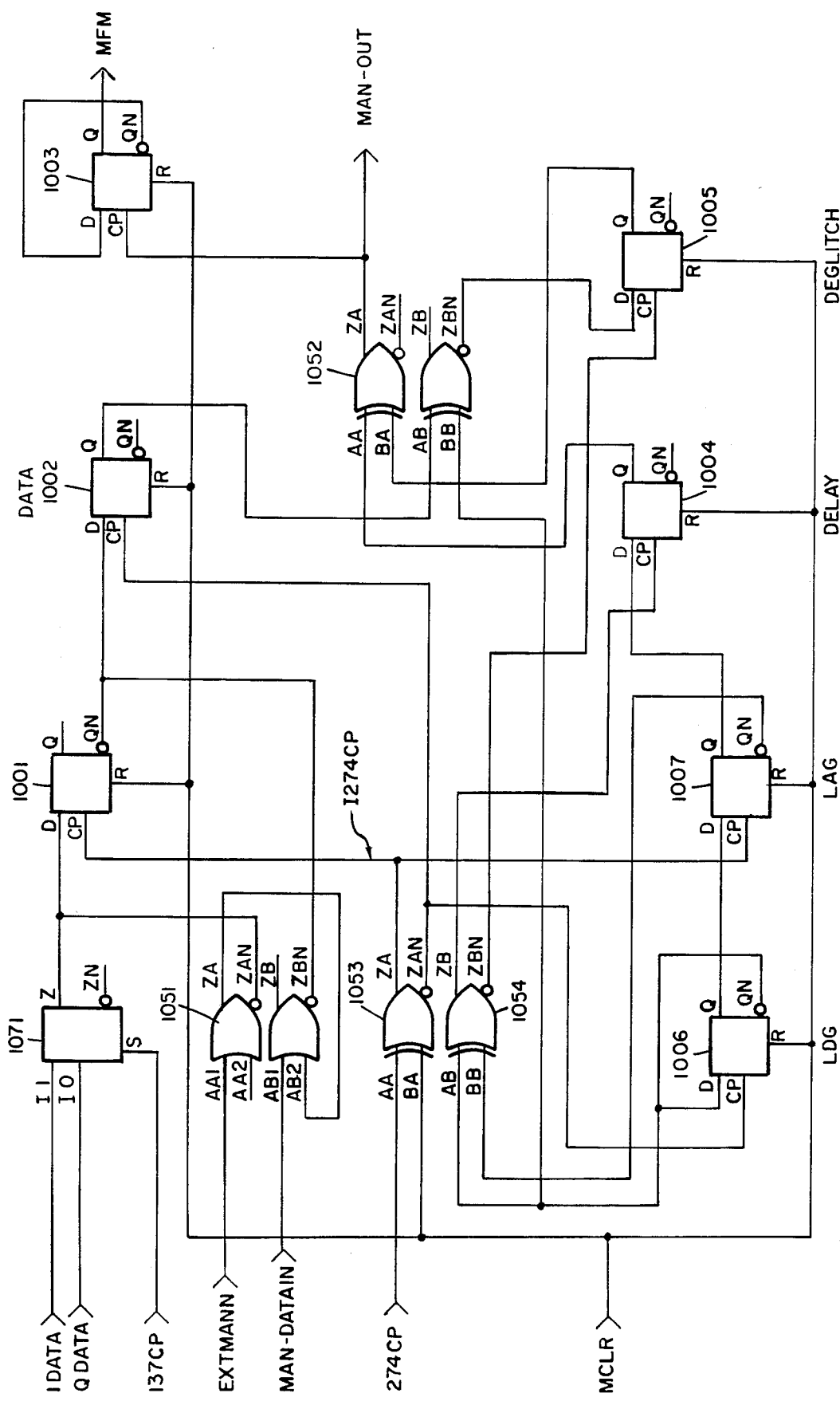
FIG. 10, is a logic diagram of the Manchester encoder circuit (MAN-ENC) of the instant invention.

Referring now to FIG. 10, there is shown a logic diagram of the Manchester encoder which has two modes of operation. It can either receive external data or it can combine the internal I and Q channels into one composite channel to be the source for the Manchester encoded output (MAN-OUT). If the I and Q channels are selected, these signals enter through mux 1071. The 137 MHz clock (137CP) multiplexes the I or the Q channel depending upon whether the clock is low or high. Flip-flop 1001 recombines the I and the Q data into one 274 MHz inverted data channel. If the information is enabled from the external world, the negative external Manchester signal (EXTMANN) is low which forces NOR gate 1051 to produce a high level signal ZAN. This high signal will force flip-flop 1001 output QN to remain low. Thus, whatever signal is present at terminal ZBN of NOR gate 1055 (which is the inverse of the external Manchester data) to be loaded into flip-flop 1002. Therefore, flip-flop 1002 will always contain either the inverted combined I and Q data stream or the inverted external Manchester Data In signal. It will be noted that flip-flop 1002 is clocked by the inverted clock of flip-flop 1001. Exclusive OR gate 1053 receives the 274 MHz clock (274CP) and produces both a true (I274CP) and an inverted (I274CPN) 274 MHz clock for internal timing purposes.

Due to the timing constraints, it is desirable to regenerate the 274 MHz clocks through flip-flops 1006 and 1007 along with Exclusive OR gate 1054. Flip-flop 1006 divides the 1274CPN in half thereby generating a 137 MHz clock. Flip-flop 1007 follows flip-flop 1006 but one half of a clock period later (I274CP). The outputs of flip-flops 1006 and 1007 are sent through gate 1054 where the output signal ZB recreates a clock similar to I274CP but slightly delayed. The ZBN signal recreates a clock similar to I274CPN but, also, slightly delayed. The delays are caused by flip-flop and gate propogation delays. Flip-flop 1004 follows flip-flop 1007 by the newly generated clock at gate 1054 terminal ZB. Flip-flop 1005 samples the combination of the inverted data out of flip-flop 1002 which is Exclusive OR ADDed to the clock out of the flip-flop 1006 using the regenerated clock out of gate 1054 at terminal ZBN. This will offset the data combined with the clock so that when the output Q of flip-flop 1005 is combined with the clock signal at flip-flop 1004 output terminal Q through Exclusive OR gate 1052 at terminal ZA there will be no alignment changes so that the Manchester encoded data will emerge "glitch" free. (Thus, flip-flop 1005 is referred to as the "de-glitch" flip-flop). It must be noted that this Manchester encoded data stream is equivalent to 550 MHz data.

In addition, the Manchester encoded output signal is divided by a factor of two by flip-flop 1003. This produces a Miller frequency modulated data output in addition to the Manchester encoded data output.

Thus, there is shown and described a multiplexer system which has dual channel and high frequency rate capability. This system is especially useful in applications referred to as data links which are used to communicate between at least two separate locations. As noted, the locations can include ground-to-air, ground-to-ground, air-to-air or virtually any other application. The system shown and described supra is a preferred embodiment of the invention and includes a number of specific components. Some of these components can be modified or combined to perform and function in a manner substantially similar to the instant teaching. In addition, certain components described above can be omitted in some cases without seriously affecting the overall operation of the subject system.

While certain specific devices and functions are shown and described, it should be understood that these are illustrative only and are not to be considered limitative of the invention. For example, the type of logic circuitry can be altered to operate on different signal levels. Also, certain frequency rates are recited as highly desirable. It is clear that these frequencies can be changed for different applications without departing from the thrust of this teaching.

Clearly, this description is illustrative only and is not intended to be limitative. Thus, any modifications to the system which are made by those skilled in the art but which fall within the purview of this description are intended to be included therein as well. In fact, the scope of the invention is limited only by the claims appended hereto.

We claim:

1. A multiplexing system comprising,
   timer means for producing a plurality of timing signals,
   said timer means adapted to receive a master clock signal and produce a plurality of timing signals including reduced rate clock signals which are supplied to other circuit components in said system,
   phase adjuster means for aligning input data signals with internal timing signals from said timer means,
   first multiplexer means capable of operation at a first rate connected to receive signals from said timer means and from said phase adjuster means and to supply output signals which are representative of the input data signals and the internal timing signals,
   said first multiplexer means includes first synchronizer means which synchronizes the operation of said first multiplexer means, and
   second multiplexer means capable of operation at a second rate other than said first rate connected to receive signals from said timer means and from said phase adjuster means and to produce output signals which are representative of the input data signal and the internal timing signals,
   said second multiplexer means includes second synchronizer means which synchronizes the operation of said second multiplexer means.

2. The system recited in claim 1 wherein,
   said phase adjuster means includes high speed phase adjusters connected to said second multiplexer means and lower speed phase adjusters connected to said first multiplexer means.

3. The system recited in claim 1 including
   pseudo-number generator means which supplies a pseudo-numder code to said first multiplexer means via said phase adjuster means.

4. The system recited in claim 3 wherein,
   said pseudo-number generator means receives a clock signal and supplies a pseudo-number signal to said first multiplexer means via said phase adjuster means.

5. The system recited in claim 1 including,
   code generator means connected to said second multiplexer means to selectively overlay a code signal on the data streams supplied to said second multiplexer means.

6. The system recited in claim 5 wherein,
   said code generator means receives clock signals from said timer means and supplies a pseudo-number signal to said second multiplexer means.

7. The system recited in claim 5 wherein,
   said first synchronizer means is connected to said pseudo-number generator means to control the operation of said pseudo-number generator means and the application of a pseudo-number signal to said first multiplexer means.

8. The system recited in claim 1 including, encoding means connected to receive signals from said second multiplex means.

9. The system recited in claim 8 wherein, said encoding means is connected to provide a Manchester encoded output signal.

10. The system recited in claim 9 wherein, said encoding means produces a Miller frequency modulation output signal.

11. The system recited in claim 1 wherein, said phase adjuster means includes a plurality of phase adjusting circuits which assure a proper relationship between the input data signals and the respective timing signals produced by said timer means.

12. The system recited in claim 1 wherein, said second multiplexer means is capable of narrowband and wideband operation which have different frequency rates.

13. The system recited in claim 1 wherein, said second synchronizer means generates sync bits which are inserted into the signal streams in said second multiplexer means.

14. The system recited in claim 13 wherein, each of said first and second synchronizing means generates a Barker code signal.

15. The system recited in claim 14 wherein, said second synchronizing means also generates the complement of said Barker code signal.

16. The system recited in claim 1 wherein, said first synchronizer means generates sync bits which are inserted into the signal streams in said first multiplexer means.

17. The system recited in claim 1 wherein, said phase adjuster means receive said input data signals from external user devices.

18. The system recited in claim 17 wherein, said phase adjuster means prevent the sampling of said input data signals at a transition portion thereof.

19. The system recited in claim 1 wherein, said second multiplexer means is arranged to operate on at least two different streams of input data signals.

20. The system recited in claim 19 wherein, said second multiplexer means produces two output data streams at quadrature and the complements thereof.

* * * * *

UNITED STATES PATENT AND TRADEMARK OFFICE
CERTIFICATE OF CORRECTION

PATENT NO. : 4,685,106
DATED : August 4, 1987
INVENTOR(S) : Larry J. Miller et al It is certified that error appears in the above-identified patent and that said Letters Patent is hereby corrected as shown below:

Column 14, line 49, before "mux" insert -- of --.

Column 18, line 49, "pseudo-numder" should be --pseudo-number--.

Signed and Sealed this

Twenty-seventh Day of October, 1987

Attest:

DONALD J. QUIGG

*Attesting Officer*       *Commissioner of Patents and Trademarks*